US010494930B2

(12) United States Patent
Craig, III

(10) Patent No.: US 10,494,930 B2
(45) Date of Patent: Dec. 3, 2019

(54) CERAMIC MATRIX COMPOSITE COMPONENT COOLING

(71) Applicant: General Electric Company, Schenectady, NY (US)

(72) Inventor: Charles William Craig, III, West Chester, OH (US)

(73) Assignee: General Electric Company, Schenectady, NY (US)

( * ) Notice: Subject to any disclaimer, the term of this patent is extended or adjusted under 35 U.S.C. 154(b) by 360 days.

(21) Appl. No.: 15/184,149

(22) Filed: Jun. 16, 2016

(65) Prior Publication Data
US 2017/0362941 A1 Dec. 21, 2017

(51) Int. Cl.
*F01D 5/18* (2006.01)
*F01D 9/06* (2006.01)

(52) U.S. Cl.
CPC ............. *F01D 5/187* (2013.01); *F01D 9/065* (2013.01); *F05D 2240/122* (2013.01); *F05D 2260/2212* (2013.01); *F05D 2300/6033* (2013.01); *Y02T 50/672* (2013.01); *Y02T 50/676* (2013.01)

(58) Field of Classification Search
CPC .... F01D 9/065; F01D 5/187; F05D 2240/122; F05D 2260/221; F05D 2300/6033; Y02T 50/672; Y02T 50/676
See application file for complete search history.

(56) References Cited

U.S. PATENT DOCUMENTS

| 5,624,231 A | * | 4/1997 | Ohtomo | F01D 5/186 415/115 |
|---|---|---|---|---|
| 6,325,593 B1 | | 12/2001 | Darkins, Jr. et al. | |
| 7,527,474 B1 | * | 5/2009 | Liang | F01D 5/186 416/1 |
| 8,585,350 B1 | * | 11/2013 | Liang | F01D 5/189 415/115 |
| 2009/0274549 A1 | * | 11/2009 | Mitchell | F01D 5/182 415/115 |
| 2011/0236178 A1 | * | 9/2011 | Devore | B22C 9/04 415/1 |
| 2014/0083639 A1 | * | 3/2014 | Bonini | B22D 25/02 164/69.1 |
| 2014/0170433 A1 | * | 6/2014 | Schick | B22F 7/08 428/548 |
| 2015/0004000 A1 | | 1/2015 | Freeman et al. | |

(Continued)

*Primary Examiner* — Eldon T Brockman
(74) *Attorney, Agent, or Firm* — Dority & Manning, P.A.

(57) ABSTRACT

Nozzle segments and methods of cooling airfoils of nozzle segments are provided. For example, a turbine nozzle segment includes an inner band defining an inner band cavity and/or an outer band defining an outer band cavity. The inner band may define an inner band aperture extending from the inner band cavity through the inner band, and the outer band may define an outer band aperture extending from the outer band cavity through the outer band. Inner and/or outer band cooling passages may extend through a trailing edge portion of a CMC airfoil of the nozzle segment. An inlet of any inner band cooling passage is defined adjacent an inner band aperture, and an inlet of any outer band cooling passage is defined adjacent an outer band aperture. The cooling passage inlets are aligned with the adjacent inner or outer band apertures to provide cooling fluid from the respective cavity.

7 Claims, 14 Drawing Sheets

(56) References Cited

U.S. PATENT DOCUMENTS

2016/0177741 A1* 6/2016 Kirollos ............... F01D 25/12
                                                     415/115
2017/0175573 A1* 6/2017 Benjamin ............. F01D 9/00
2017/0234144 A1* 8/2017 Mugglestone .......... F01D 5/188
                                                     415/178
2018/0274377 A1* 9/2018 Kington .............. F01D 5/189

* cited by examiner

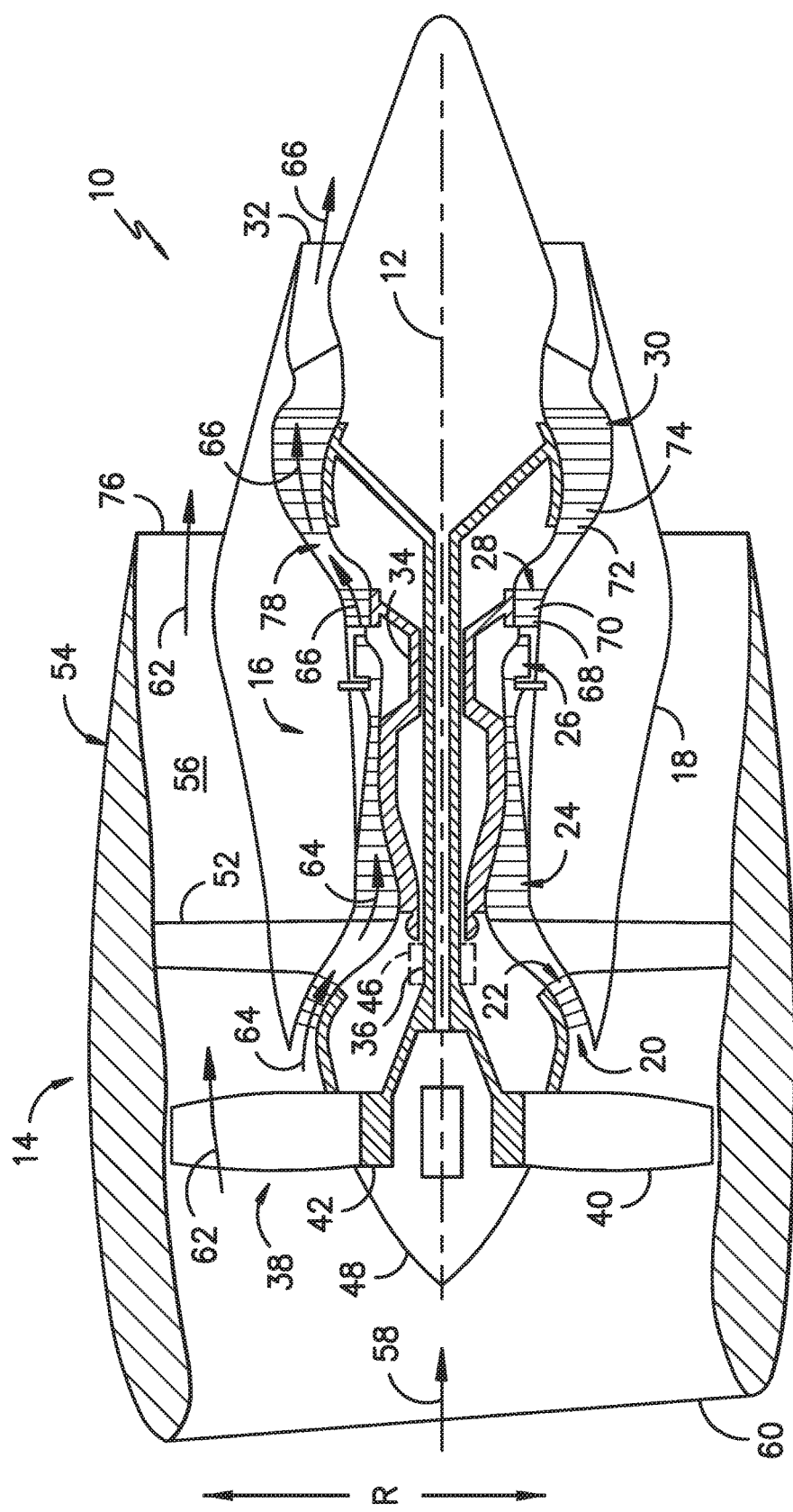

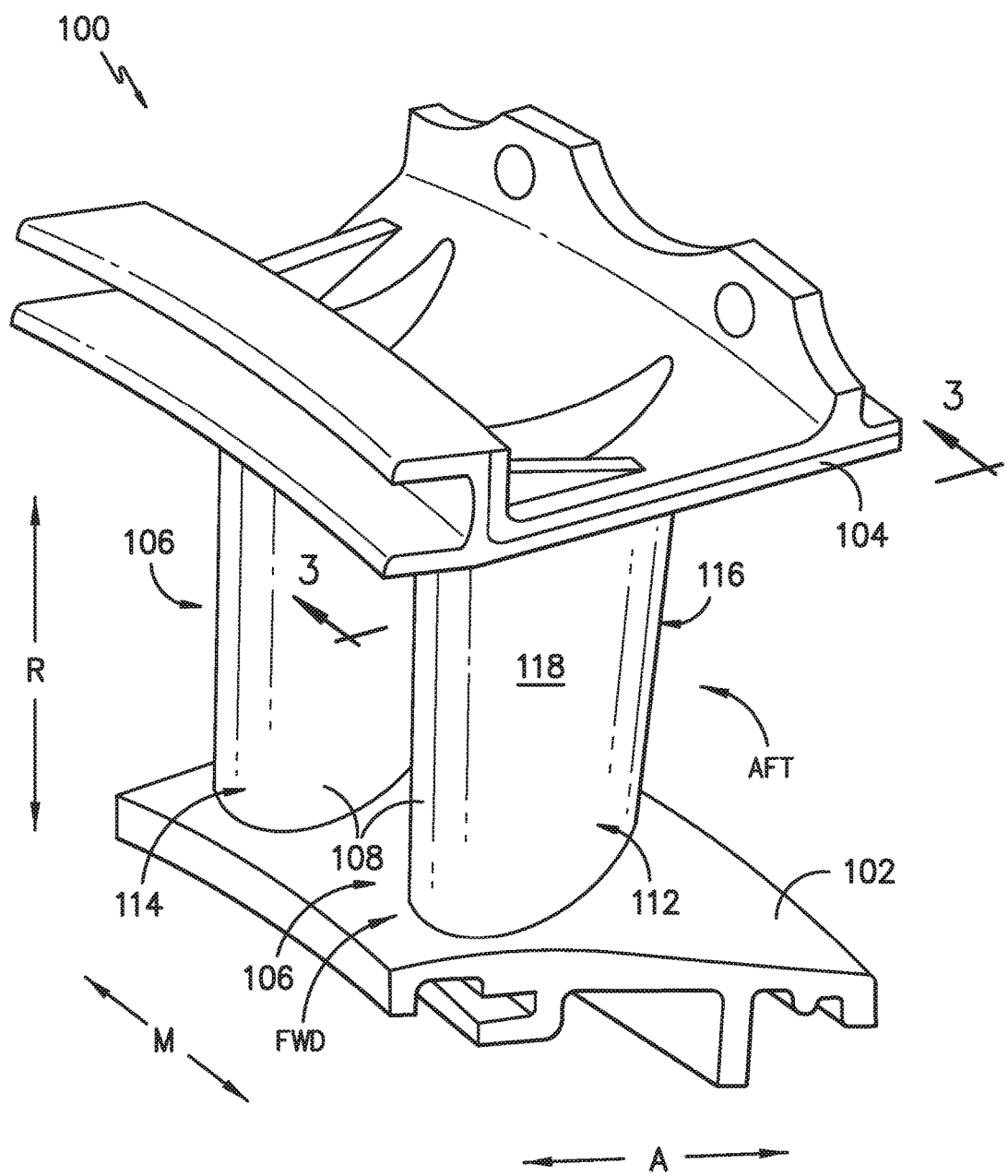
FIG. -2-

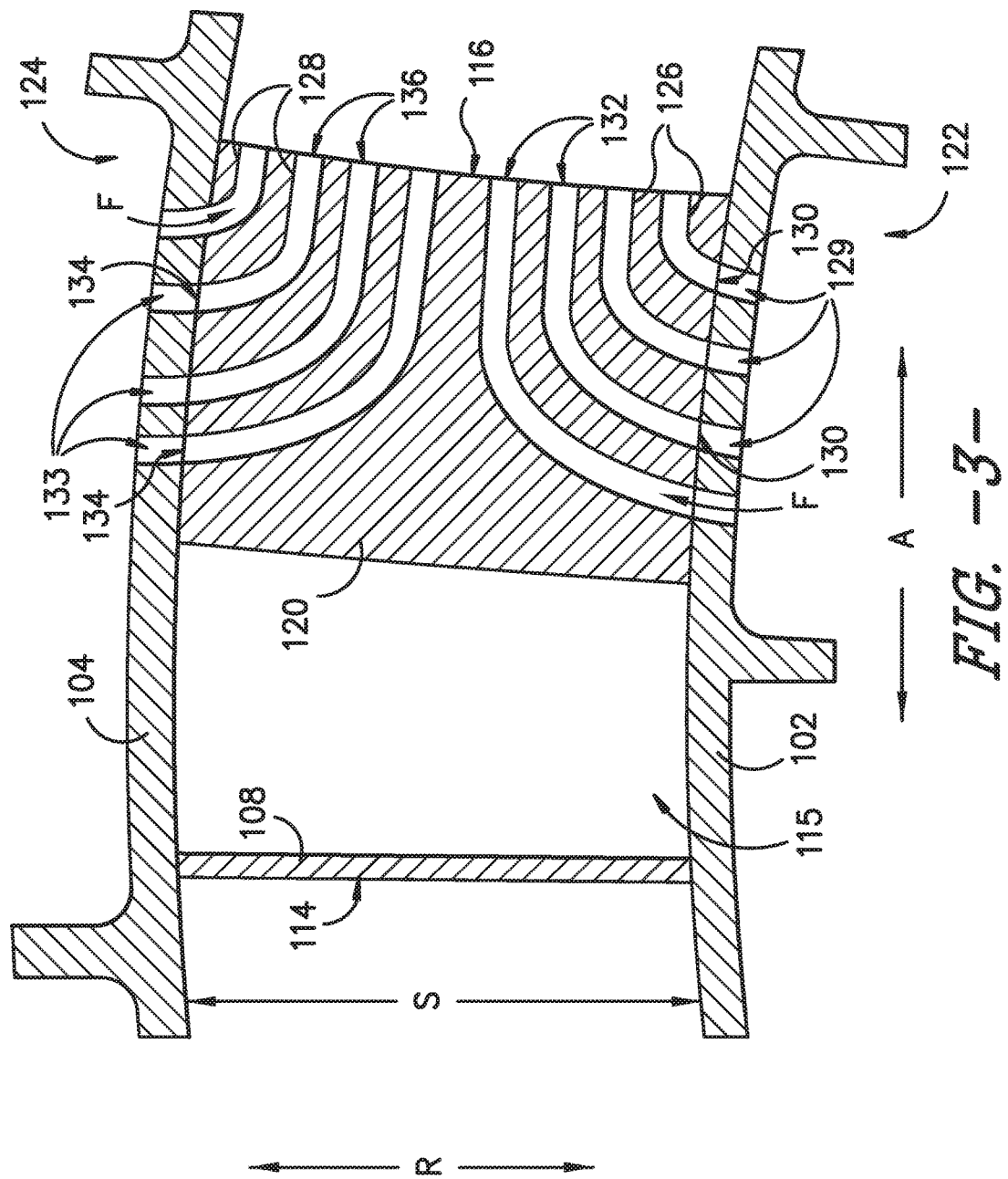
FIG. -3-

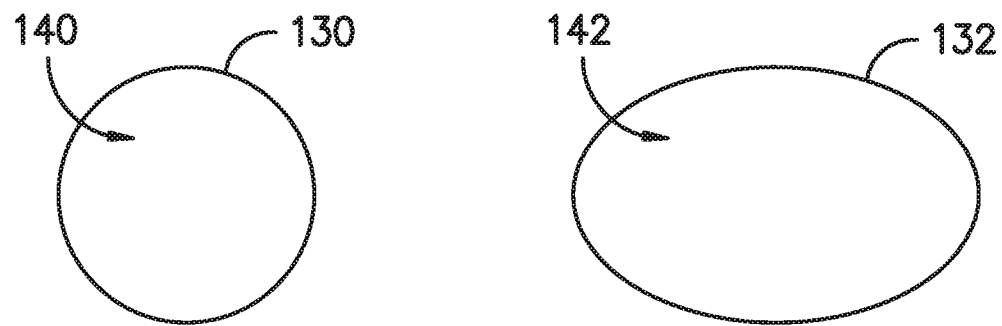
FIG. -4A-
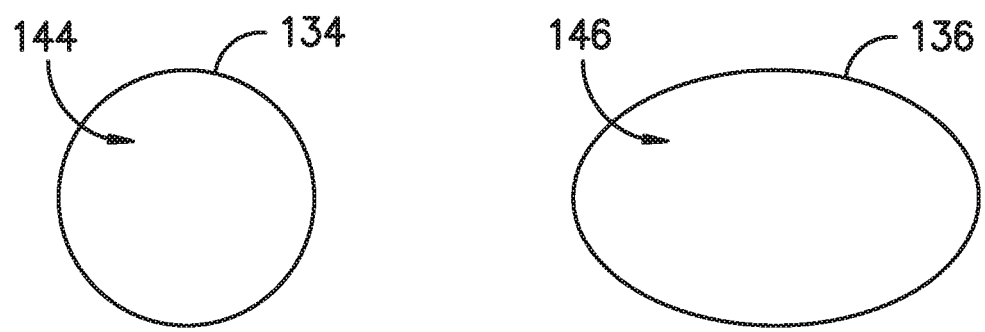
FIG. -4B-

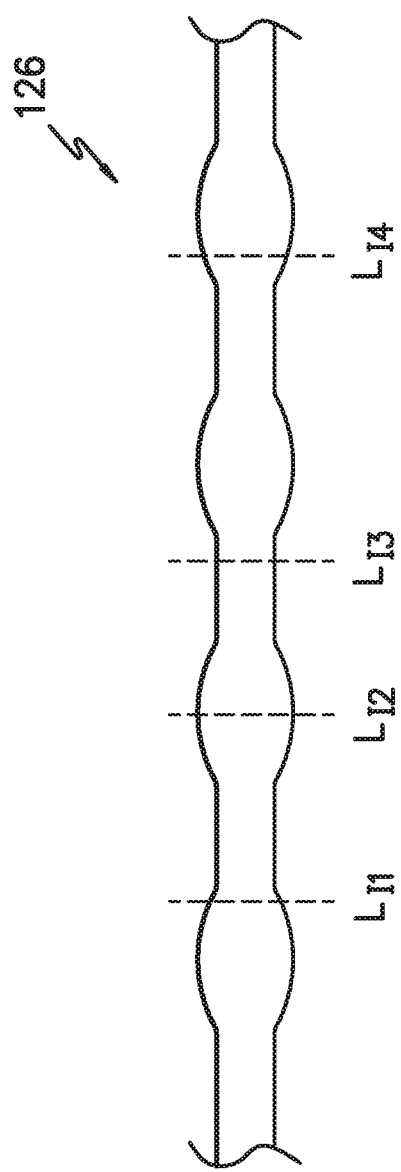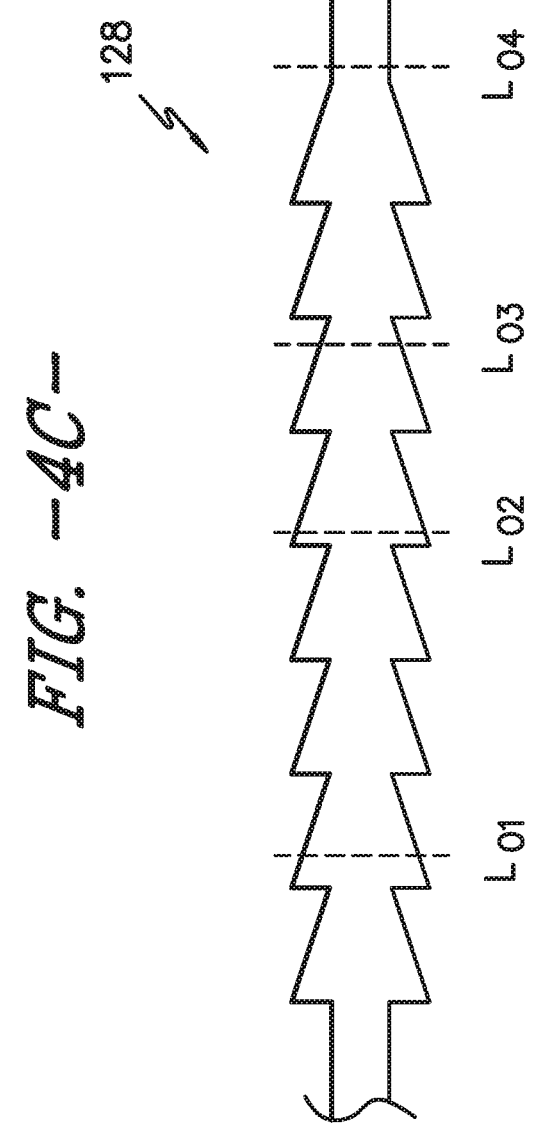
FIG. -4C-
FIG. -4D-

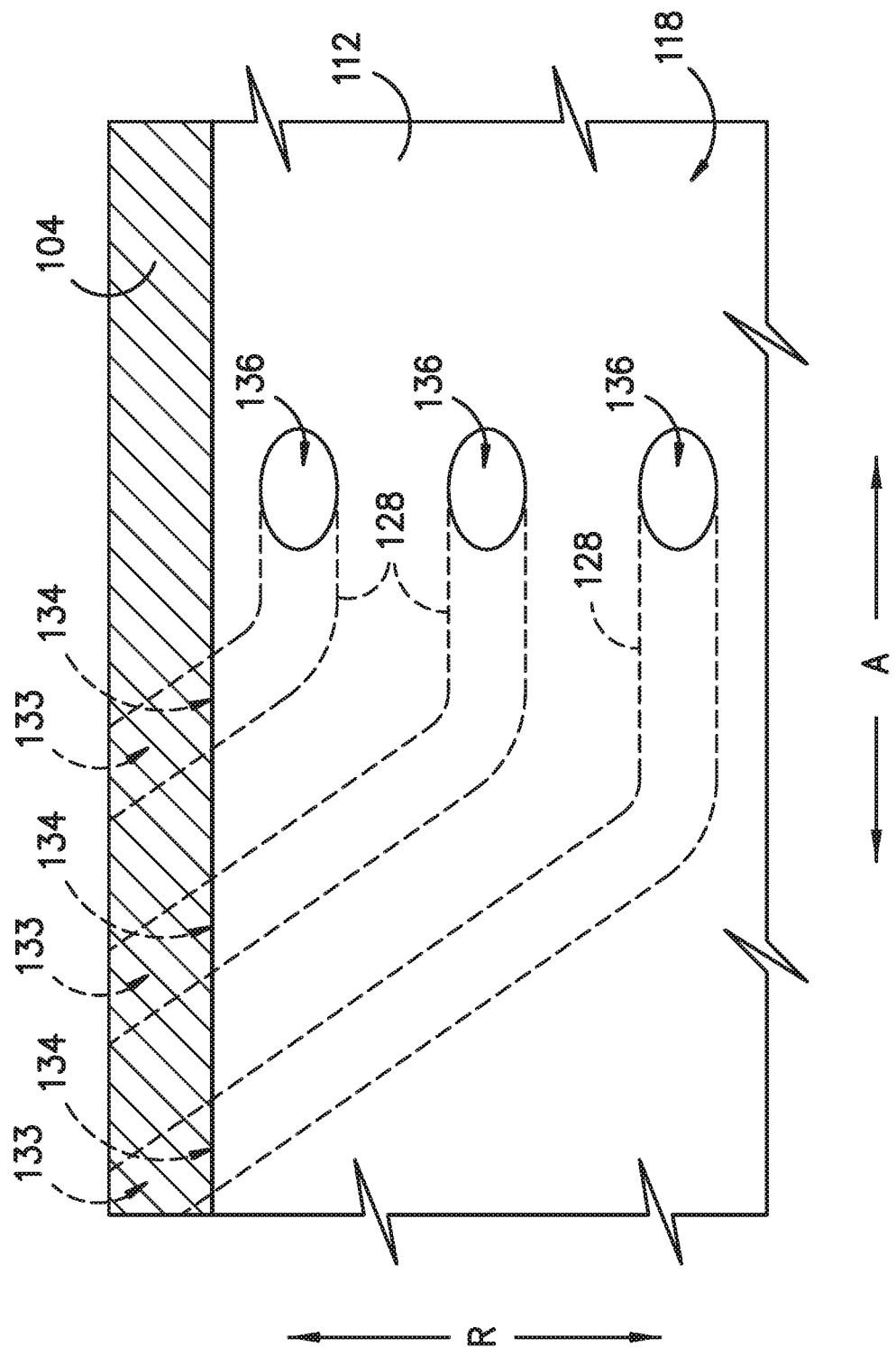
FIG. -5-

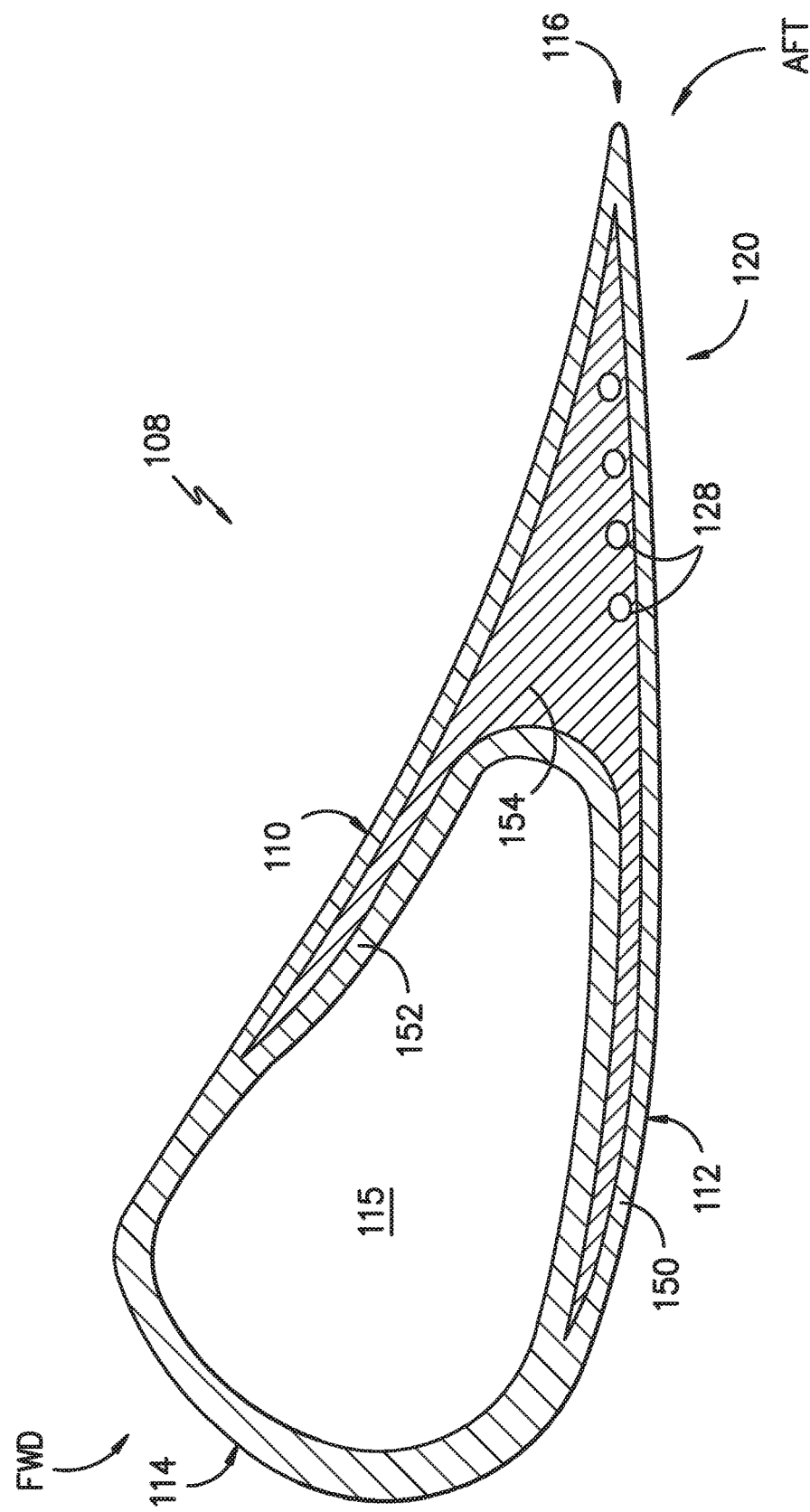
FIG. -6A-

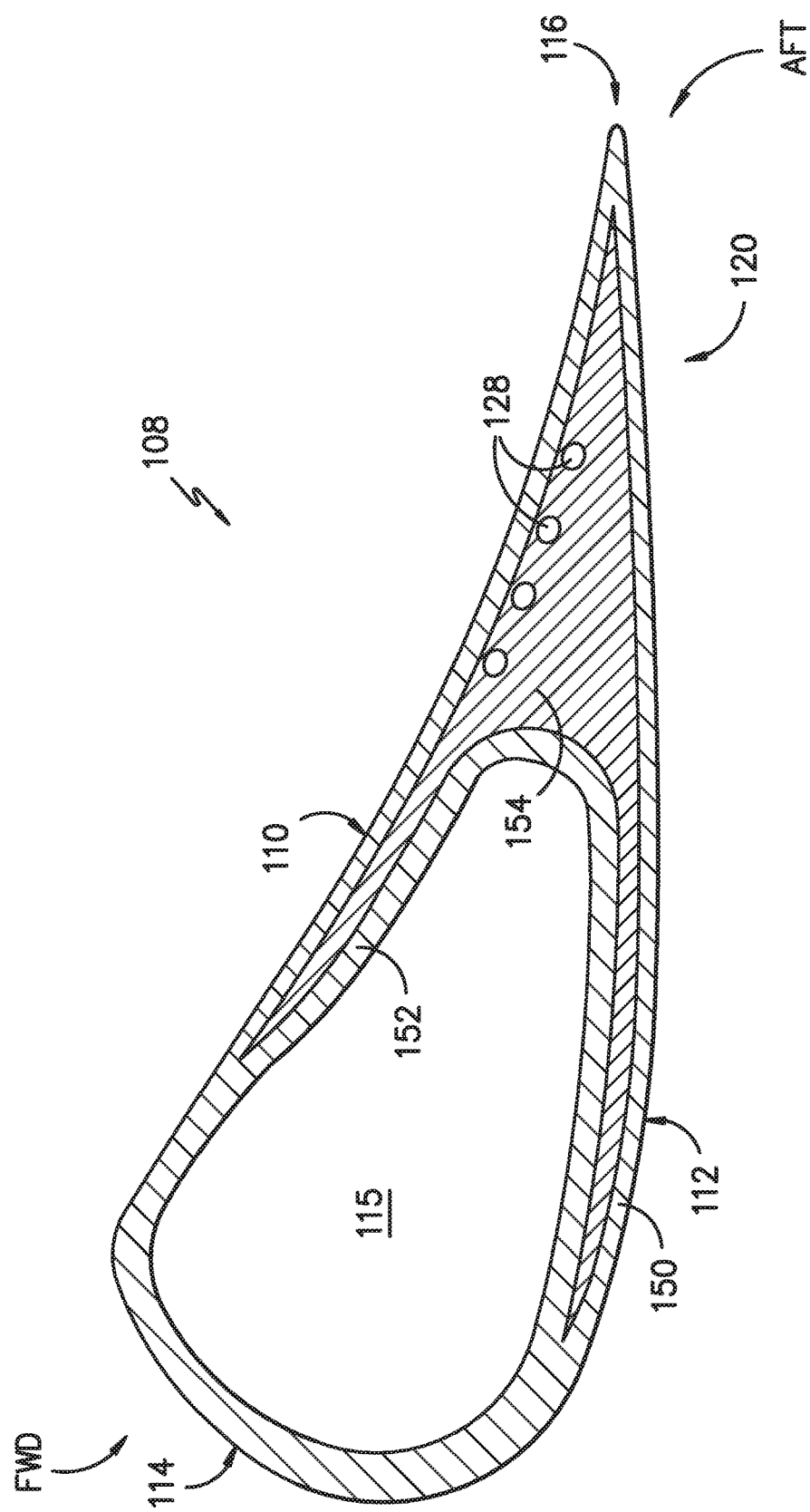

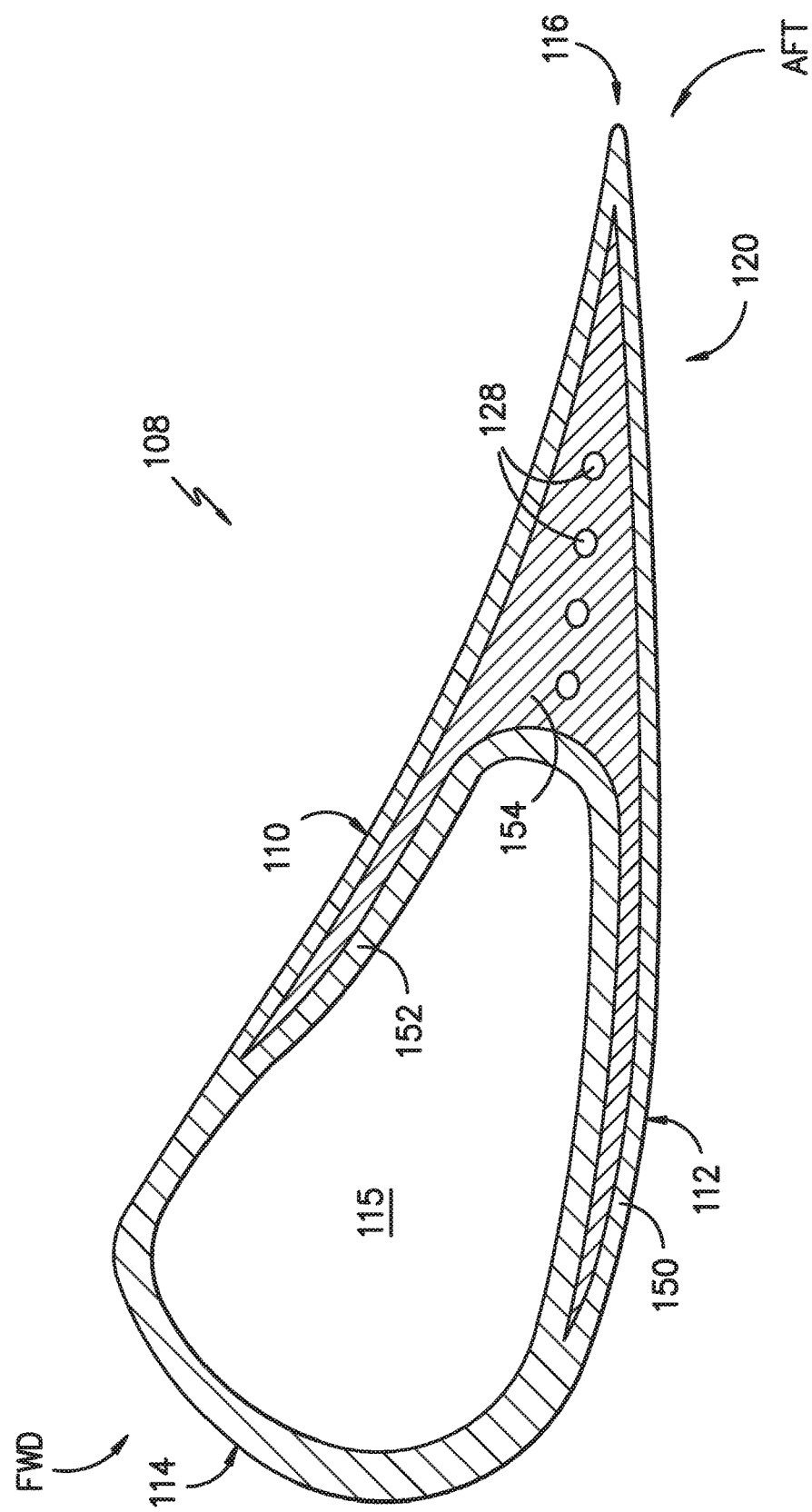

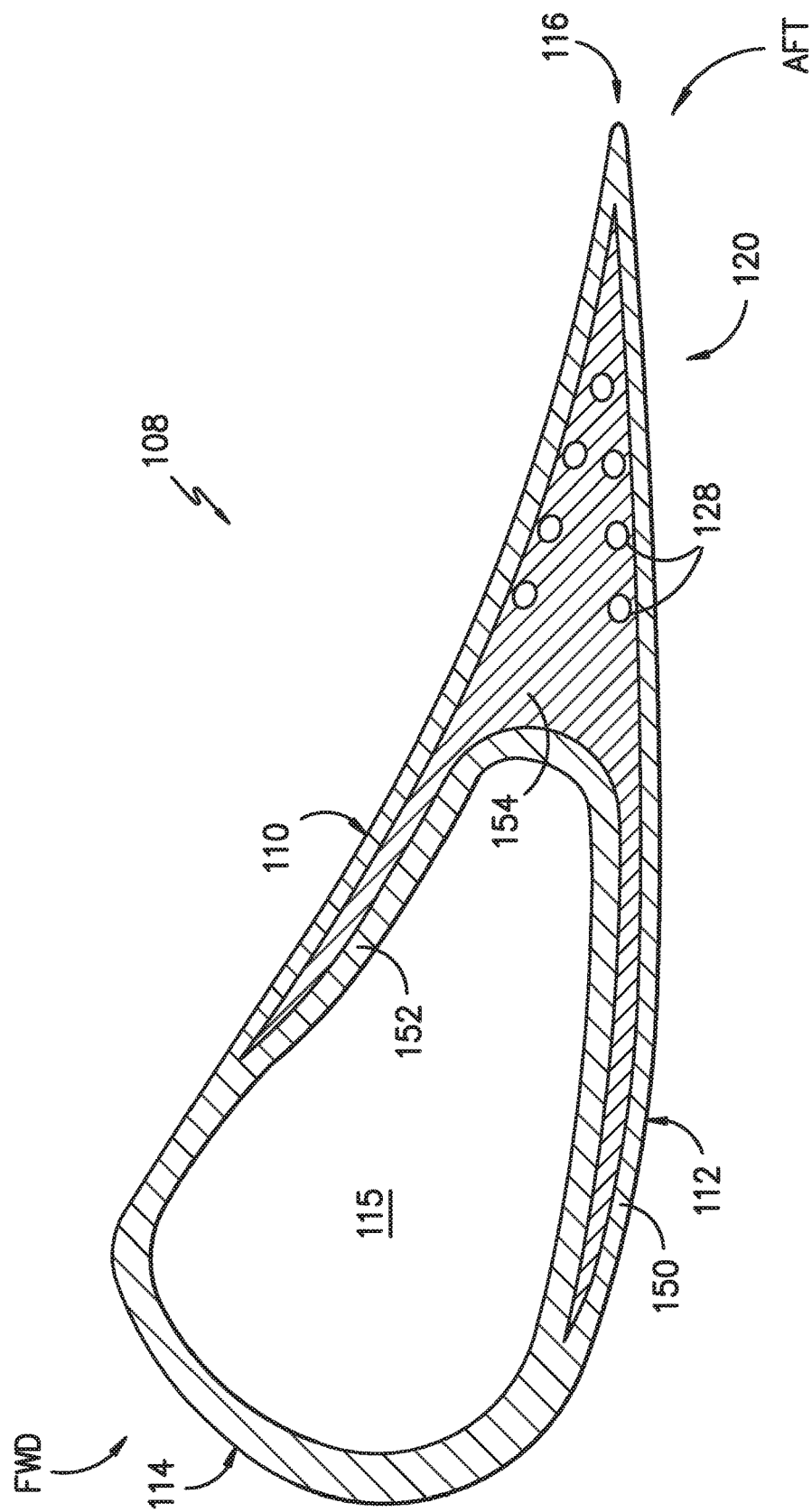
FIG. -6D-

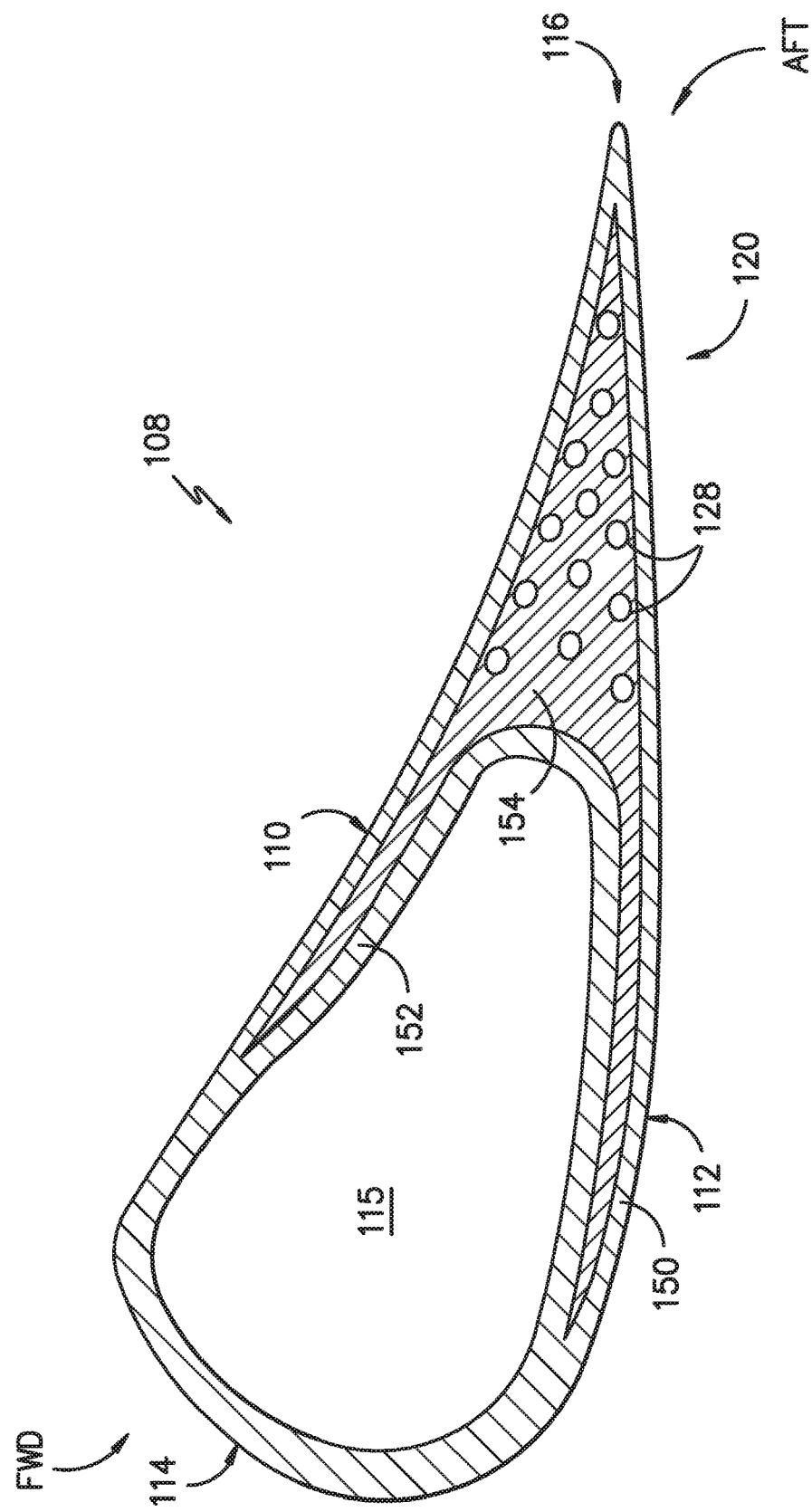
FIG. -6E-

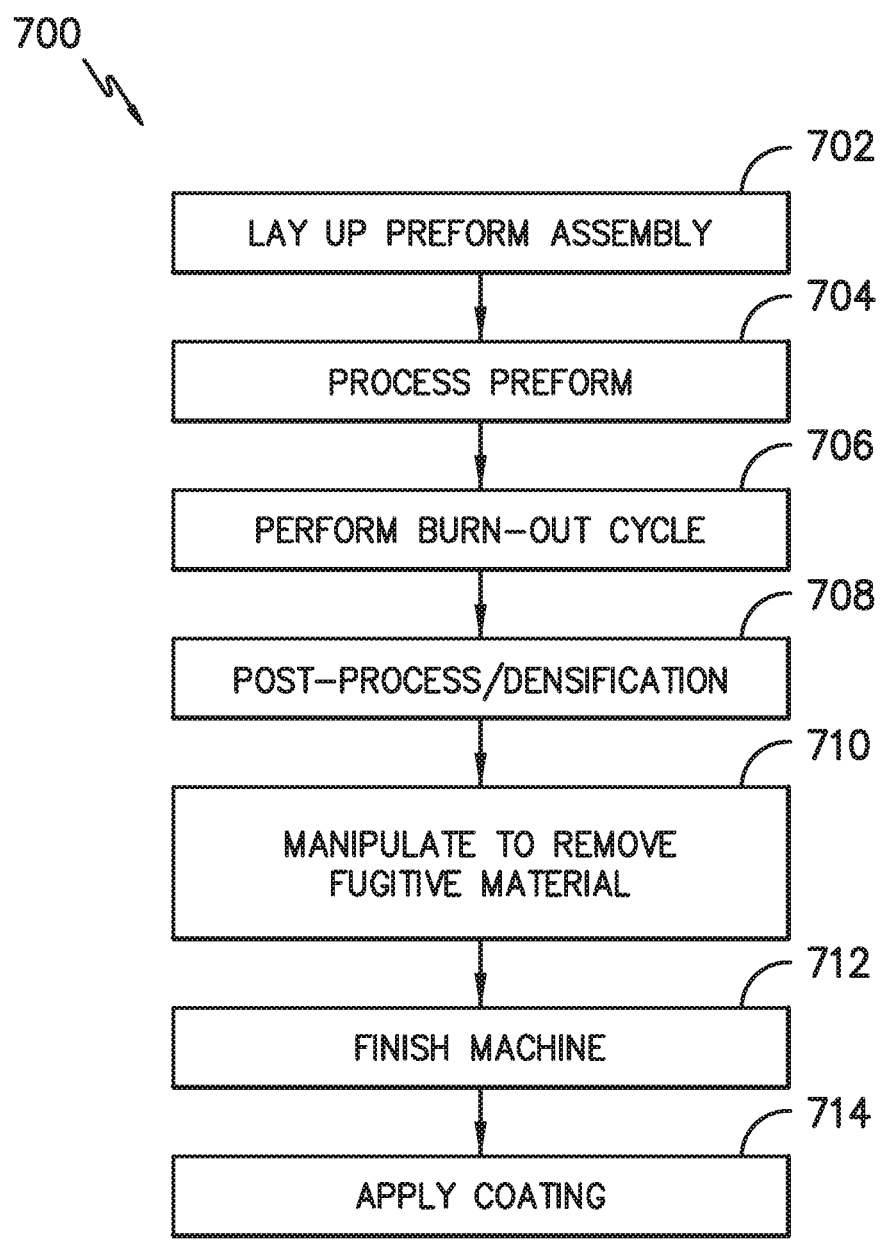
FIG. -7-

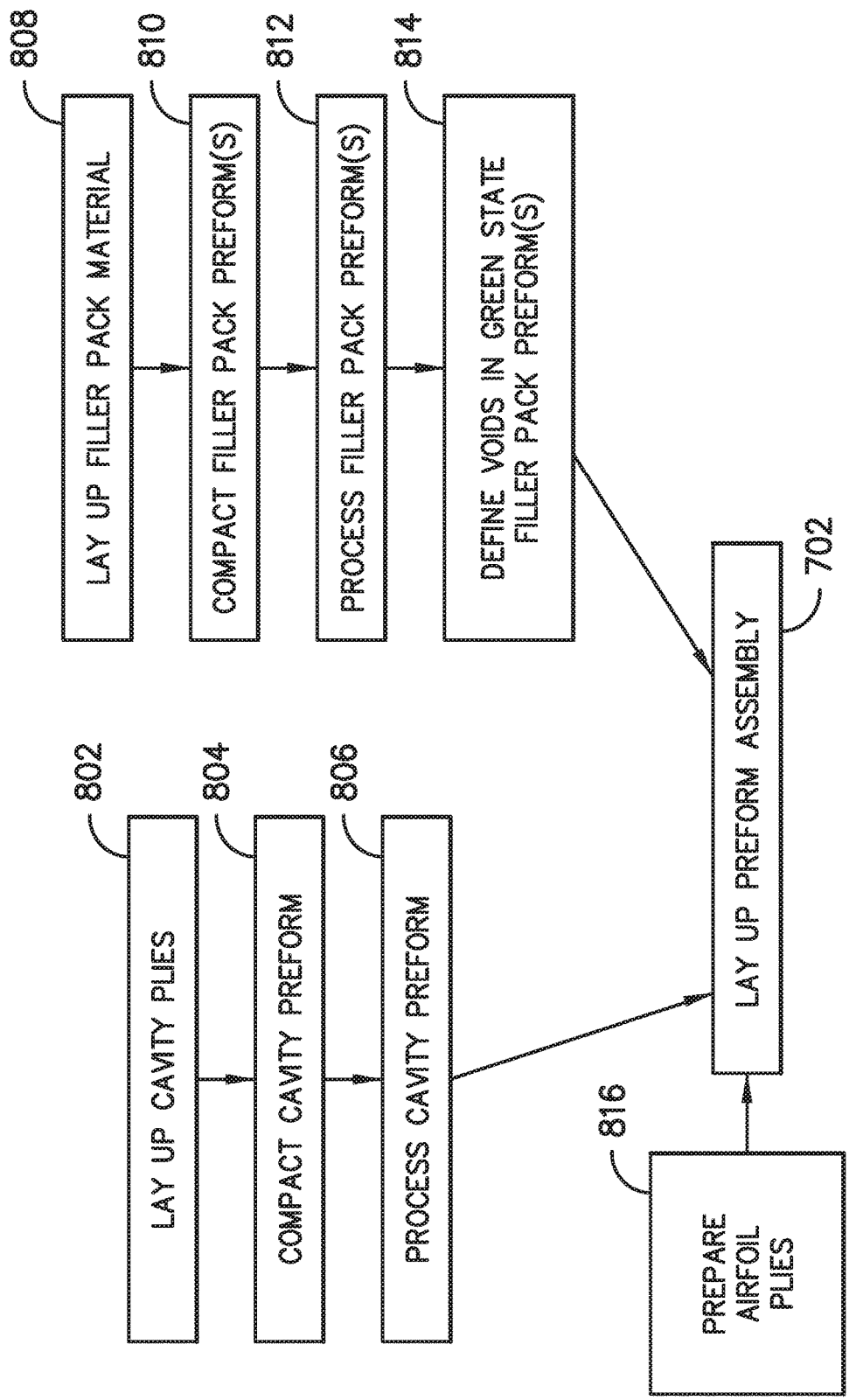
FIG. -8-

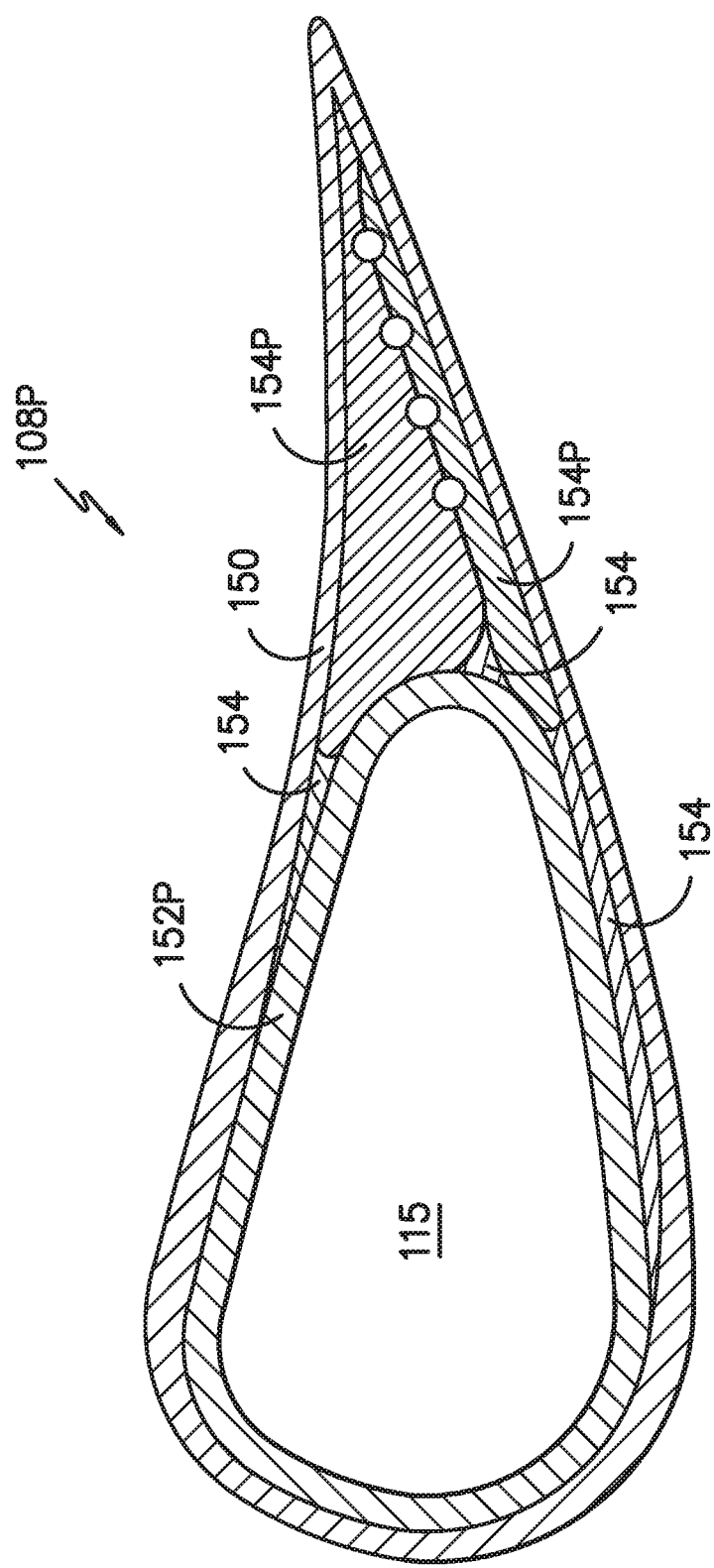
FIG. -9-

CERAMIC MATRIX COMPOSITE COMPONENT COOLING

FIELD OF THE INVENTION

The present subject matter relates generally to ceramic matrix composite component and particularly to features for cooling ceramic matrix composite internal components of gas turbine engines. More particularly, the present subject matter relates to trailing edge cooling for ceramic matrix component airfoils of gas turbine engines.

BACKGROUND OF THE INVENTION

A gas turbine engine generally includes a fan and a core arranged in flow communication with one another. Additionally, the core of the gas turbine engine generally includes, in serial flow order, a compressor section, a combustion section, a turbine section, and an exhaust section. In operation, air is provided from the fan to an inlet of the compressor section where one or more axial compressors progressively compress the air until it reaches the combustion section. Fuel is mixed with the compressed air and burned within the combustion section to provide combustion gases. The combustion gases are routed from the combustion section to the turbine section. The flow of combustion gases through the turbine section drives the turbine section and is then routed through the exhaust section, e.g., to atmosphere.

In general, turbine performance and efficiency may be improved by increased combustion gas temperatures. Non-traditional high temperature materials, such as ceramic matrix composite (CMC) materials, are more commonly being used for various components within gas turbine engines. For example, because CMC materials can withstand relatively extreme temperatures, there is particular interest in replacing components within the flow path of the combustion gases with CMC materials. However, even though CMC components may withstand more extreme temperatures than typical components, CMC components still may require cooling features or reduced exposure to the combustion gases to decrease a likelihood of negative impacts of increased combustion gas temperatures, e.g., material failures or the like.

More specifically, CMC airfoils for gas turbine engines typically have a cavity for receipt of a cooling fluid located near a forward end of the airfoil, i.e., proximate a leading edge of the airfoil. Often, an aft end of the airfoil, i.e., proximate a trailing edge of the airfoil, does not have a cavity or other feature for receipt of a cooling fluid and thus remains uncooled, which can produce a large temperature gradient between the forward end and the aft end of the airfoil. A large temperature gradient across the airfoil can increase the thermal stress on the airfoil, which can lead to material failures or other negative impacts on turbine performance.

Therefore, improved cooling features for CMC components that overcome one or more disadvantages of existing components would be desirable. In particular, a turbine nozzle segment for a gas turbine engine having cooling features in a trailing edge portion of a CMC airfoil of the turbine nozzle segment would be beneficial. Moreover, a turbine nozzle segment for a gas turbine engine having cooling features in a trailing edge portion of a CMC airfoil of the turbine nozzle segment that even out cooling of the airfoil would be desirable. Methods of cooling an airfoil of a turbine nozzle segment by supplying cooling fluid from a cavity defined by an inner and/or outer band of the turbine nozzle segment directly to an internal cooling passage defined in a trailing edge portion of the airfoil would be advantageous.

BRIEF DESCRIPTION OF THE INVENTION

Aspects and advantages of the invention will be set forth in part in the following description, or may be obvious from the description, or may be learned through practice of the invention.

In one exemplary embodiment of the present disclosure, a turbine nozzle segment for a gas turbine engine is provided. The turbine nozzle segment includes an inner band defining an inner band cavity for receipt of a cooling fluid and an inner band aperture extending from the inner band cavity through the inner band; an outer band; and a ceramic matrix composite (CMC) airfoil extending from the inner band to the outer band. The CMC airfoil includes opposite pressure and suction sides extending radially along a span. The pressure and suction sides define an outer surface of the CMC airfoil. The CMC airfoil further includes opposite leading and trailing edges extending radially along the span. The pressure and suction sides extend axially between the leading and trailing edges. The leading edge defines a forward end of the CMC airfoil, and the trailing edge defines an aft end of the CMC airfoil. The CMC airfoil also includes a trailing edge portion defined adjacent the trailing edge at the aft end of the airfoil. The turbine nozzle segment further includes an inner band cooling passage extending through the CMC airfoil from an inlet defined adjacent the inner band aperture to an outlet defined in the outer surface. The inner band aperture and the inlet of the inner band cooling passage are aligned to provide the cooling fluid from the inner band cavity to the inner band cooling passage.

In another exemplary embodiment of the present disclosure, a turbine nozzle segment for a gas turbine engine is provided. The turbine nozzle segment includes an inner band; an outer band defining an outer band cavity for receipt of a cooling fluid and an outer band aperture extending from the outer band cavity through the outer band; and a ceramic matrix composite (CMC) airfoil extending from the inner band to the outer band. The CMC airfoil includes opposite pressure and suction sides extending radially along a span. The pressure and suction sides define an outer surface of the CMC airfoil. The CMC airfoil also includes opposite leading and trailing edges extending radially along the span. The pressure and suction sides extend axially between the leading and trailing edges. The leading edge defines a forward end of the CMC airfoil, and the trailing edge defines an aft end of the CMC airfoil. The CMC airfoil further includes a trailing edge portion defined adjacent the trailing edge at the aft end of the airfoil. Additionally, the turbine nozzle segment includes an outer band cooling passage extending through the CMC airfoil from an inlet defined adjacent the outer band aperture to an outlet defined in the outer surface. The outer band aperture and the inlet of the outer band cooling passage are aligned to provide the cooling fluid from the outer band cavity to the outer band cooling passage.

In a further exemplary embodiment of the present disclosure, a method of cooling an airfoil of a turbine nozzle segment is provided. The airfoil extends from an inner band to an outer band and includes a trailing edge portion. The trailing edge portion defines an internal cooling passage for conveying a cooling fluid. The method includes supplying the cooling fluid from a cavity defined by the inner band or the outer band directly to an inlet of the cooling passage. The inlet is defined adjacent an aperture in the inner band or the outer band to provide fluid communication from the cavity to the cooling passage.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 provides a schematic cross-sectional view of an exemplary gas turbine engine according to various embodiments of the present subject matter.

FIG. 2 provides a perspective view of a turbine nozzle segment according to an exemplary embodiment of the present subject matter.

FIG. 3 provides a cross-section view of the turbine nozzle segment, taken along the line 3-3 of FIG. 2, according to an exemplary embodiment of the present subject matter.

FIG. 4A provides a schematic cross-section view of an inlet and an outlet of an inner band cooling passage, according to an exemplary embodiment of the present subject matter.

FIG. 4B provides a schematic cross-section view of an inlet and an outlet of an outer band cooling passage, according to an exemplary embodiment of the present subject matter.

FIG. 4C provides a schematic cross-section view of a portion of an inner band cooling passage, according to an exemplary embodiment of the present subject matter.

FIG. 4D provides a schematic cross-section view of a portion of an outer band cooling passage, according to an exemplary embodiment of the present subject matter.

FIG. 5 provides a partial cross-section view of a portion of the turbine nozzle segment of FIG. 2, according to an exemplary embodiment of the present subject matter.

FIG. 6A provides a cross-section view of an airfoil of the turbine nozzle segment of FIG. 2, according to an exemplary embodiment of the present subject matter.

FIG. 6B provides a cross-section view of an airfoil of the turbine nozzle segment of FIG. 2, according to another exemplary embodiment of the present subject matter.

FIG. 6C provides a cross-section view of an airfoil of the turbine nozzle segment of FIG. 2, according to another exemplary embodiment of the present subject matter.

FIG. 6D provides a cross-section view of an airfoil of the turbine nozzle segment of FIG. 2, according to another exemplary embodiment of the present subject matter.

FIG. 6E provides a cross-section view of an airfoil of the turbine nozzle segment of FIG. 2, according to another exemplary embodiment of the present subject matter.

FIG. 7 provides a chart illustrating a method for forming an airfoil of a gas turbine engine according to an exemplary embodiment of the present subject matter.

FIG. 8 provides a chart illustrating a portion of the method of FIG. 7 according to an exemplary embodiment of the present subject matter.

FIG. 9 provides a cross-section view of an airfoil preform assembly according to an exemplary embodiment of the present subject matter.

DETAILED DESCRIPTION OF THE INVENTION

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention. As used herein, the terms "first," "second," and "third" may be used interchangeably to distinguish one component from another and are not intended to signify location or importance of the individual components. The terms "upstream" and "downstream" refer to the relative direction with respect to fluid flow in a fluid pathway. For example, "upstream" refers to the direction from which the fluid flows and "downstream" refers to the direction to which the fluid flows.

Referring now to the drawings, wherein identical numerals indicate the same elements throughout the figures, FIG. 1 is a schematic cross-sectional view of a gas turbine engine in accordance with an exemplary embodiment of the present disclosure. More particularly, for the embodiment of FIG. 1, the gas turbine engine is a high-bypass turbofan jet engine 10, referred to herein as "turbofan engine 10." As shown in FIG. 1, the turbofan engine 10 defines an axial direction A (extending parallel to a longitudinal centerline 12 provided for reference) and a radial direction R. In general, the turbofan 10 includes a fan section 14 and a core turbine engine 16 disposed downstream from the fan section 14.

The exemplary core turbine engine 16 depicted generally includes a substantially tubular outer casing 18 that defines an annular inlet 20. The outer casing 18 encases, in serial flow relationship, a compressor section including a booster or low pressure (LP) compressor 22 and a high pressure (HP) compressor 24; a combustion section 26; a turbine section including a high pressure (HP) turbine 28 and a low pressure (LP) turbine 30; and a jet exhaust nozzle section 32. A high pressure (HP) shaft or spool 34 drivingly connects the HP turbine 28 to the HP compressor 24. A low pressure (LP) shaft or spool 36 drivingly connects the LP turbine 30 to the LP compressor 22.

For the depicted embodiment, fan section 14 includes a fan 38 having a plurality of fan blades 40 coupled to a disk 42 in a spaced apart manner. As depicted, fan blades 40 extend outward from disk 42 generally along the radial direction R. Fan blades 40 and disk 42 are together rotatable about the longitudinal axis 12 by LP shaft 36 across a power gear box 46. The power gear box 46 includes a plurality of gears for stepping down the rotational speed of the LP shaft 36 to a more efficient rotational fan speed.

Referring still to the exemplary embodiment of FIG. 1, disk 42 is covered by rotatable front nacelle 48 aerodynamically contoured to promote an airflow through the plurality of fan blades 40. Additionally, the exemplary fan section 14 includes an annular fan casing or outer nacelle 50 that circumferentially surrounds the fan 38 and/or at least a portion of the core turbine engine 16. It should be appreciated that nacelle 50 may be configured to be supported relative to the core turbine engine 16 by a plurality of circumferentially-spaced outlet guide vanes 52. Moreover, a downstream section 54 of the nacelle 50 may extend over an outer portion of the core turbine engine 16 so as to define a bypass airflow passage 56 therebetween.

During operation of the turbofan engine 10, a volume of air 58 enters turbofan 10 through an associated inlet 60 of the nacelle 50 and/or fan section 14. As the volume of air 58 passes across fan blades 40, a first portion of the air 58 as indicated by arrows 62 is directed or routed into the bypass airflow passage 56 and a second portion of the air 58 as indicated by arrows 64 is directed or routed into the LP compressor 22. The ratio between the first portion of air 62 and the second portion of air 64 is commonly known as a bypass ratio. The pressure of the second portion of air 64 is then increased as it is routed through the high pressure (HP) compressor 24 and into the combustion section 26, where it is mixed with fuel and burned to provide combustion gases 66.

The combustion gases 66 are routed through the HP turbine 28 where a portion of thermal and/or kinetic energy from the combustion gases 66 is extracted via sequential stages of HP turbine stator vanes 68 that are coupled to the outer casing 18 and HP turbine rotor blades 70 that are coupled to the HP shaft or spool 34, thus causing the HP shaft or spool 34 to rotate, thereby supporting operation of the HP compressor 24. The combustion gases 66 are then routed through the LP turbine 30 where a second portion of thermal and kinetic energy is extracted from the combustion gases 66 via sequential stages of LP turbine stator vanes 72 that are coupled to the outer casing 18 and LP turbine rotor blades 74 that are coupled to the LP shaft or spool 36, thus causing the LP shaft or spool 36 to rotate, thereby supporting operation of the LP compressor 22 and/or rotation of the fan 38.

The combustion gases 66 are subsequently routed through the jet exhaust nozzle section 32 of the core turbine engine 16 to provide propulsive thrust. Simultaneously, the pressure of the first portion of air 62 is substantially increased as the first portion of air 62 is routed through the bypass airflow passage 56 before it is exhausted from a fan nozzle exhaust section 76 of the turbofan 10, also providing propulsive thrust. The HP turbine 28, the LP turbine 30, and the jet exhaust nozzle section 32 at least partially define a hot gas path 78 for routing the combustion gases 66 through the core turbine engine 16.

In some embodiments, components of turbofan engine 10, particularly components within hot gas path 78, may comprise a ceramic matrix composite (CMC) material, which is a non-metallic material having high temperature capability. Exemplary CMC materials utilized for such components may include silicon carbide, silicon, silica, or alumina matrix materials and combinations thereof. Ceramic fibers may be embedded within the matrix, such as oxidation stable reinforcing fibers including monofilaments like sapphire and silicon carbide (e.g., Textron's SCS-6), as well as rovings and yarn including silicon carbide (e.g., Nippon Carbon's NICALON®, Ube Industries' TYRANNO®, and Dow Corning's SYLRAIVIIC®), alumina silicates (e.g., Nextel's 440 and 480), and chopped whiskers and fibers (e.g., Nextel's 440 and SAFFIL®), and optionally ceramic particles (e.g., oxides of Si, Al, Zr, Y, and combinations thereof) and inorganic fillers (e.g., pyrophyllite, wollastonite, mica, talc, kyanite, and montmorillonite). As further examples, the CMC materials may also include silicon carbide (SiC) or carbon fiber cloth.

CMC materials may be used for various components of the engine, for example, turbine nozzles and/or airfoils in the compressor, and/or fan regions. Turbine nozzles, comprising stator vanes extending between inner and outer bands, direct the hot combustion gas in a manner to maximize extraction at the adjacent downstream turbine blades. As such, CMC materials are desirable for use in forming turbine nozzles exposed to the high temperatures of the hot combustion gases. Of course, other components of turbine engine 10 also may be formed from CMC materials.

Referring now to FIG. 2, a perspective view is provided of a turbine nozzle segment 100 according to an exemplary embodiment of the present subject matter. A turbine stator is formed by a plurality of turbine nozzle segments 100 that are abutted at circumferential ends, e.g., ends or sides spaced apart along a circumferential direction M, to form a complete ring about centerline 12. Each nozzle segment 100 may comprise an inner band 102 and an outer band 104 with one or more vanes 106 extending from inner band 102 to outer band 104. In some embodiments, vanes 106 may be vanes 68 of HP turbine 28 or vanes 72 of LP turbine 30 described above. Each stator vane 106 includes an airfoil 108 having a concave pressure side 110 (FIGS. 6A-6E) opposite a convex suction side 112. Opposite pressure and suction sides 110, 112 of each airfoil 108 extend radially along a span S (FIG. 3) from a vane root at inner band 102 to a vane tip at outer band 104. Moreover, pressure and suction sides 110, 112 of airfoil 108 extend axially between a leading edge 114 and an opposite trailing edge 116. Leading edge 114 defines a forward end of airfoil 108 (labeled FWD in the Figures), and trailing edge 116 defines an aft end of airfoil 108 (labeled AFT in the Figures). Pressure and suction sides 110, 112 of airfoil 108 define an outer surface 118 of the airfoil. Additionally, airfoil 108 may define a cavity 115 (FIG. 3) adjacent leading edge 114 for receiving a flow of cooling fluid, e.g., a flow of pressurized air diverted from HP compressor 24. As such, cavity 115 may provide cooling to the portion of airfoil 108 adjacent the leading edge 114.

FIG. 3 provides a cross-sectional view of turbine nozzle segment 100, taken along the line 3-3 of FIG. 2. As shown in FIG. 3, inner band 102 of turbine nozzle segment 100 defines an inner band cavity 122, and outer band 104 defines an outer band cavity 124. Inner band cavity 122 and outer band cavity 124 each receive a flow of cooling fluid F, e.g., a flow of pressurized air diverted from HP compressor 24. In some embodiments of turbine nozzle segment 100, inner band cavity 122 may be omitted such that nozzle segment 100 includes only outer band cavity 124, or outer band cavity 124 may be omitted such that nozzle segment 100 includes only inner band cavity 122.

As further depicted in FIG. 3, airfoil 108 includes a trailing edge portion 120 that is defined adjacent the trailing edge 116 at the aft end of airfoil 108. A plurality of internal inner band cooling passages 126 and a plurality of internal outer band cooling passages 128 are defined through trailing edge portion 120 to convey cooling fluid F directly from inner band and outer band cavities 122, 124 to outer surface 118 of airfoil 108. Cooling passages 126, 128 provide cooling to trailing edge portion 120, e.g., by providing increased thermal gradient control to reduce thermal stresses in airfoil 108. That is, cooling passages 126, 128 in trailing edge portion 120 can help even out temperature gradients in airfoil 108 to render airfoil 108 more isothermal than airfoil 108 without cooling passages 126, 128. Particularly in airfoil 108 having cavity 115 that receives cooling fluid adjacent the leading edge 114 of the airfoil, balancing the thermal gradients of airfoil 108 by also providing cooling adjacent the trailing edge 116 via cooling passages 126 and/or cooling passages 128 may help improve the life of airfoil 108, as well as the performance of gas turbine engine 10. Thus, a method of cooling airfoil 108 of turbine nozzle segment 100 includes supplying the cooling fluid F from inner band cavity 122 directly to inner band cooling passage 126 and/or supplying the cooling fluid F from outer band cavity 124 directly to outer band cooling passage 128.

More particularly, inner band 102 defines a plurality of inner band apertures 129 extending from the inner band cavity 122 through the inner band 102. Each inner band cooling passage 126 extends through airfoil 108 from an inlet 130 defined adjacent an inner band aperture 129 to an outlet 132 defined in the outer surface 118. Each inner band inlet 130 is aligned with an inner band aperture 129 to supply cooling fluid F from inner band cavity 122 to inner band cooling passage 126 and, more particularly, to supply cooling fluid F from cavity 122 directly to inlet 130. That is, each inlet 130 is defined adjacent an inner band aperture 129 to provide fluid communication from inner band cavity 122 directly to inner band cooling passage 126. Further, each inner band aperture 129 and inlet 130 may be defined at any suitable axial, circumferential, or radial position, e.g., to facilitate direct fluid communication between inner band cavity 122 and the respective inner band cooling passage 126.

Similarly, outer band 104 defines a plurality of outer band apertures 133 extending from the outer band cavity 124 through the outer band 104. Each outer band cooling passage 128 extends through airfoil 108 from an inlet 134 defined adjacent an outer band aperture 133 to an outlet 136 defined in the outer surface 118. Each outer band inlet 134 is aligned with an outer band aperture 133 to supply cooling fluid F from outer band cavity 124 to outer band cooling passage 128 and, more specifically, to supply cooling fluid F from cavity 124 directly to inlet 134. That is, each inlet 134 is defined adjacent an outer band aperture 133 to provide fluid communication from outer band cavity 124 directly to outer band cooling passage 128. Moreover, each outer band aperture 133 and inlet 134 may be defined at any suitable axial, circumferential, or radial position, e.g., to facilitate fluid communication between outer band cavity 124 and the respective outer band cooling passage 128.

Of course, in some embodiments, airfoil 108 may not include a plurality of inner and outer band cooling passages 126, 128. Rather, some embodiments may include only an inner cooling passage 126 or an outer cooling passage 128. Still other embodiments may include only a plurality of inner cooling passages 126 or, alternatively, only a plurality of outer cooling passages 128. Yet other embodiments may include one inner cooling passage 126 and one outer cooling passage 128. Other numbers of inner and outer cooling passages 126, 128 may be used as well.

Referring still to FIG. 3, the inlet 130 of each inner band cooling passage 126 is defined at a different radial position than the outlet 132 of the respective inner band cooling passage 126. Similarly, the inlet 134 of each outer band cooling passage 128 is defined at a different radial position than the outlet 136 of the respective outer band cooling passage 128. Moreover, the inlet 130 of each inner band cooling passage 126 is defined at a different radial position than the outlet 136 of each outer band cooling passage 128, and the inlet 134 of each outer band cooling passage 128 is defined at a different radial position than the outlet of each inner band cooling passage 126. In the embodiment shown in FIG. 3, the inlets 130 of inner band cooling passages 126 are defined radially inward with respect to outlets 132 of inner band cooling passages 126, as well as outlets 136 of outer band cooling passages 128. The inlets 134 of outer band cooling passages 128 are defined radially outward with respect to outlets 136 of outer band cooling passages 128, as well as outlets 132 of inner band cooling passages 126.

Further, as can be seen in FIG. 3, an inlet 130 of an inner band cooling passage 126 lies in a first plane and the corresponding outlet 132 of the inner band cooling passage 126 lies in a second plane, and the first and second planes intersect one another. That is, the first and second planes are not parallel to one another but, for example, may be orthogonal to one another or at another angle with respect to one another such that the planes intersect at right angles or another angle. The inlets 134 and outlets 136 of outer band cooling passages 128 are similarly defined, i.e., an inlet 134 lies in a first plane and the corresponding outlet 136 of the outer band cooling passage 128 lies in a second plane, and the first and second planes intersect one another and, e.g., may be orthogonal to each other. In some embodiments, such as the embodiment shown in FIG. 3, the first planes of inlets 130, 134 may extend generally parallel to a plane defined by the axial direction A and circumferential direction M. The second planes of outlets 132, 136 may extend generally parallel to a plane defined by the radial direction R and circumferential direction M.

As further shown in FIG. 3, each inner band cooling passage 126 comprises at least one change in direction between the inlet 130 and the outlet 132 of inner band cooling passage 126, and each outer band cooling passage 128 comprises at least one change in direction between the inlet 134 and the outlet 136 of outer band cooling passage 128. For example, in the depicted embodiment of FIG. 3, each inner band cooling passage 126 transitions from extending in a generally radial direction adjacent inlet 130 to extending in a generally axial direction adjacent outlet 132. Likewise, each outer band cooling passage 128 transitions from extending in a generally radial direction adjacent inlet 134 to extending in a generally axial direction adjacent outlet 136. As such, the inlets 130 are not axially or radially aligned with the outlets 132, and the inlets 134 are not axially or radially aligned with the outlets 136. Although FIG. 3 depicts cooling passages 126, 128 as including one change in direction, in other embodiments, cooling passages 126, 128 may include different or additional changes in direction between their inlets and outlets. For example, cooling passages 126, 128 may incorporate no change in direction such that the passages 126, 128 are generally straight, or cooling passages 126, 128 may incorporate two or more changes in direction. Of course, in some embodiments, not all inner band cooling passages 126 may be configured the same, i.e., some cooling passages 126 may be generally straight, some may include one change in direction, and/or some may include two or more changes in direction. Similarly, in some embodiments not all outer band cooling passages 128 may be configured the same, i.e., some cooling passages 128 may be generally straight, some may include one change in direction, and/or some may include two or more changes in direction.

Moreover, inner band cooling passage 126 and/or outer band cooling passage 128 may include one or more changes in cross-sectional area along their length. In one embodiment, as shown in FIG. 4A, each inner band cooling passage 126 has an inlet cross-sectional area 140 and an outlet cross-sectional area 142, and the inlet cross-sectional area 140 is different from the outlet cross-sectional area 142. Inlet cross-sectional area 140 may be larger or smaller than outlet cross-sectional area 142, and whether inlet cross-sectional area 140 is larger or smaller than outlet cross-sectional area 142 may depend on the cooling needed within airfoil 108 or the cooling to be provided by fluid exiting the inner band cooling passages 126. In other embodiments, inlet cross-sectional area 140 may be equal to outlet cross-sectional area 142. In still other embodiments, the inlet cross-sectional area 140 of one inner band cooling passage 126 may be different from the inlet cross-sectional area 140 of another inner band cooling passage 126, and/or the outlet cross-sectional area 142 of one inner band cooling passage 126 may be different from the outlet cross-sectional area 142 of another inner band cooling passage 126. Further, as depicted in FIG. 4B, in one embodiment each outer band cooling passage 128 has an inlet cross-sectional area 144 and an outlet cross-sectional area 146, and the inlet cross-sectional area 144 is different from the outlet cross-sectional area 146. Inlet cross-sectional area 144 may be larger or smaller than outlet cross-sectional area 146, and whether inlet cross-sectional area 144 is larger or smaller than outlet cross-sectional area 146 may depend on the cooling needed within airfoil 108 or the cooling to be provided by fluid exiting the outer band cooling passages 128. In other embodiments, inlet cross-sectional area 144 may be equal to outlet cross-sectional area 146. In still other embodiments, the inlet cross-sectional area 144 of one outer band cooling passage 128 may be different from the inlet cross-sectional area 144 of another outer band cooling passage 128, and/or the outlet cross-sectional area 146 of one outer band cooling passage 128 may be different from the outlet cross-sectional area 146 of another outer band cooling passage 128. Moreover, although shown as substantially the same in FIGS. 4A and 4B, the inlet cross-sectional area 140 of one or more passages 126 may be different from the inlet cross-sectional area 144 of one or more passages 128, and/or the outlet cross-sectional area 142 of one or more passages 126 may be different from the outlet cross-sectional area 146 of one or more passages 128. Of course, in some embodiments, the inlet cross-sectional areas 140, 144 may be equal and/or the outlet cross-sectional areas 142, 146 may be equal, or any combination of cross-sectional areas 140, 142, 144, 146 (e.g., some or all of the cross-sectional areas 140, 142, 144, 146) may be equal.

In other embodiments, the cross-sectional area may vary between the inlet and outlet of the cooling passages 126, 128. For example, as illustrated in FIG. 4C, a cross-sectional area of inner band cooling passage 126 at a first location $L_{I1}$ between the inlet 130 and the outlet 132 is different from a cross-sectional area of inner band cooling passage 126 at a second location $L_{I2}$ between the inlet 130 and the outlet 132. Similarly, as illustrated in FIG. 4D, a cross-sectional area of outer band cooling passage 128 at a first location $L_{O1}$ between the inlet 134 and the outlet 136 is different from a cross-sectional area of outer band cooling passage 128 at a second location $L_{O2}$ between the inlet 134 and the outlet 136. In some embodiments, the cross-sectional area of inner band cooling passage 126 and outer band cooling passage 128 may be different at more than two locations between the inlet and outlet of the respective cooling passage 126, 128, such as at locations $L_{I1}$, $L_{I2}$, $L_{I3}$, $L_{I4}$, etc. of cooling passage 126 as shown in FIG. 4C and locations $L_{O1}$, $L_{O2}$, $L_{O3}$, $L_{O4}$, etc. of cooling passage 128 as shown in FIG. 4D. As one example, the cross-sectional area of cooling passages 126, 128 may taper from their inlets to their outlets or from their outlets to their inlets. As another example, such as depicted in FIGS. 4C and 4D, the cross-sectional area of cooling passages 126, 128 may vary locally along the length of the cooling passages such that the cross-sectional area transitions from a larger to a smaller cross-sectional area (or conversely, from a smaller to a larger cross-sectional area) at several locations along the length of the cooling passages. In some embodiments incorporating both inner band cooling passages 126 and outer band cooling passages 128, the cross-sectional area of inner band cooling passages 126 may vary in the same way as the cross-sectional area of outer band cooling passages 128. However, in other embodiments, at least a portion of the inner band cooling passages 126 may have a cross-sectional area that varies in a different way than a cross-sectional area of at least a portion of the outer band cooling passages 128. Varying the geometry of the cooling passages 126, 128 by varying their cross-sectional area may produce turbulating features within the cooling passages, which can contribute to the cooling effects provided by the cooling passages.

Further, inner band cooling passages 126 and outer band cooling passages 128 may have any appropriate cross-sectional shape. For example, the cross-sectional shape of each cooling passage 126, 128 may be generally circular, oval, rectangular, polygonal, or any other suitable shape. In some embodiments, the cross-sectional shape of a given cooling passage 126, 128 may vary from its inlet to its outlet. For example, the shape of an inner band cooling passage 126 may transition from a generally circular shape at its inlet 130 to a generally oval shape at its outlet 132; an outer band cooling passage 128 may similarly transition in shape from its inlet 134 to its outlet 136. In other embodiments, the cross-sectional shape of cooling passages 126, 128 may vary at several locations along their length. As an example, the cross-sectional shape may transition from generally circular to generally oval and then transition from generally oval to generally circular; these transitions may be repeated over the length of the cooling passage 126, 128. Further, for embodiments including both inner band cooling passages 126 and outer band cooling passages 128, the cross-section of inner band cooling passages 126 may be a different shape and/or size from the cross-section of outer band cooling passages 128. Alternatively, some inner band cooling passages 126 may have the same cross-sectional size and shape as some outer band cooling passages 128. In some embodiments, the geometry, e.g., cross-sectional size and/or shape or the overall length, of some inner band cooling passages 126 may vary from the geometry of other inner band cooling passages 126. In still other embodiments, the geometry, e.g., cross-sectional size and/or shape or the overall length, of some outer band cooling passages 128 may vary from the geometry of other outer band cooling passages 128. That is, not all inner band cooling passages 126 or outer band cooling passages 128 necessarily have the same geometry; the geometry may vary between respective passages 126 or passages 128 and/or may vary between passages 126 and passages 128. Other combinations of cross-sectional shape and size may be used as well.

The shape, size, and number of cooling passages 126, 128 may be optimized for each airfoil. For example, the number of inner band cooling passages 126 and/or outer band cooling passages 128 included within a given airfoil 108 may depend on the relative size of the airfoil. Further, the size, shape, and/or number of cooling passages 126, 128 may depend on the desired cooling effects achieved by flowing cooling fluid from inner band cavity 102 and/or outer band cavity 104 through cooling passages 126, 128. For example, achieving high velocity cooling fluid flow through cooling passages 126, 128 may increase the heat transfer coefficient and thereby increase the rate of cooling provided by cooling passages 126, 128. As a result, having a larger number of cooling passages 126, 128 with smaller cross-sectional areas may be beneficial. However, too many voids within the airfoil can be detrimental to the strength of the material forming the airfoil and having too many cooling passages can increase cooling flow to an extent that negatively impacts the performance of engine 10. Therefore, an optimal number, shape, and size of cooling passages 126, 128 provides beneficial cooling without overly weakening the airfoil material or negatively impacting engine performance.

Referring back to FIG. 3, the outlet 132 of each inner band cooling passage 126 is defined in outer surface 118 of airfoil 108 at the trailing edge 116 of the airfoil, and the outlet 136 of each outer band cooling passage 128 is defined in outer surface 118 of airfoil 108 at the trailing edge 116 of the airfoil. However, in other embodiments, outlets 132, 136 may be defined at other locations in outer surface 118, such as in outer surface 118 at pressure side 110 of airfoil 108 or in outer surface 118 at suction side 112 of airfoil 108. For example, as shown in FIG. 5, outlets 136 of outer band cooling passages 128 are biased to suction side 112 of airfoil 108. Thus, in various embodiments, cooling passages 126, 128 may break out along the trailing edge 116 for trailing edge ejection cooling, or cooling passages 126, 128 may break out on the pressure side 110, suction side 112, or both sides 110, 112 of airfoil 108, e.g., to lay down a film of cooling fluid on the respective airfoil side 110, 112 or to otherwise provide pressure and/or suction side 110, 112 cooling. Of course, in some embodiments, cooling passages 126, 128 may break out along the trailing edge 116 and one of the pressure side 110 or suction side 112 and in other embodiments, cooling passages 126, 128 may break out along trailing edge 116 and both of pressure side 110 and suction side 112.

Turning now to FIGS. 6A through 6E, airfoil 108 preferably is a CMC component of engine 10, as previously discussed. In some embodiments, inner and outer bands 102, 104 also may be made from a CMC material such that each turbine nozzle segment 100 is a CMC component of engine 10. In the embodiments depicted in FIGS. 6A through 6E, pressure and suction sides 110, 112 of airfoil 108 are defined by a first plurality of CMC plies 150, which also may be referred to as airfoil plies 150. Airfoil 108 further comprises a second plurality of CMC plies 152 defining cavity 115 within airfoil 108; the second plurality of plies 152 also may be referred to as cavity plies 152. Each of the plurality of airfoil plies 150 extends from pressure side 110 to suction side 112 of airfoil 108. Cavity plies 152 define cavity 115 between pressure and suction sides 110, 112, i.e., within airfoil 108. One or more filler packs 154 are positioned between airfoil plies 150 and cavity plies 152 within trailing edge portion 120 of airfoil 108. It will be appreciated that filler pack(s) 154 also may be positioned between airfoil and cavity plies 150, 152 within other portions of airfoil 108. In other embodiments, filler pack(s) 154 may be omitted, and airfoil 108 and its features may be defined by airfoil plies 150 or a combination of airfoil plies 150 and cavity plies 152.

Preferably, airfoil and cavity plies 150, 152 contain continuous CMC fibers along their lengths. Continuous fiber CMC plies can help avoid relying on the interlaminar capability of the airfoil material to resist stresses on the airfoil. The continuous fibers may be maintained, e.g., by wrapping each airfoil ply 150 from one of pressure and suction sides 110, 112 to the other of pressure and suction sides 110, 112 around one or both of leading and trailing edges 114, 116. Cavity plies 152 may be wrapped around a mandrel or other appropriate support to help maintain continuous fibers in plies 152.

It should be appreciated that, in general, filler packs 154 may be formed from any suitable material and/or by using any suitable process. For example, in several embodiments, each filler pack 154 may be formed from a suitable fiber-reinforced composite material, such as a carbon or glass fiber-reinforced composite material. For instance, one or more fabric plies may be wrapped in a suitable manner to form one or more filler packs 154 defining the desired shape of an interior of airfoil 108, such as by shaping suitable ply packs to form each filler pack 154. In another embodiment, discontinuous materials, such as short or chopped fibers, particulates, platelets, whiskers, etc., may be dispersed throughout a suitable matrix material and used to form each filler pack 154.

Additionally, it should be appreciated that, in several embodiments, each filler pack 154 may correspond to a pre-fabricated component. In such embodiments, the filler pack(s) 154 may be installed within the interior of airfoil 108 during or following manufacturing of the nozzle segment 100. Alternatively, each filler pack 154 may be assembled or otherwise formed within airfoil 108. For instance, when filler pack 154 is formed from one or more fabric plies, the plies may be laid up within airfoil 108 together with the plies being used to create the airfoil structure, e.g., airfoil plies 150 and cavity plies 152.

Various methods, techniques, and/or processes may be used to form cooling passages 126, 128 in airfoil 108. For example, in some embodiments, the portion of cooling passages 126, 128 defined through airfoil plies 150 may be defined by cutting each individual airfoil ply 150 before plies 152 are laid up to form airfoil 108. Plies 150 may be cut, e.g., using a precision Gerber cutter by Gerber Technology of Tolland, Conn. In other embodiments, another type of cutter or other means may be used to form cut-outs in airfoil plies 150 to define at least a portion of inner band cooling passage(s) 126 and/or outer band cooling passage(s) 128. Alternatively or additionally, at least a portion of cooling passages 126, 128 may be defined using electrical discharge machining (EDM), i.e., EDM drilling, laser machining, precision machining, or other suitable machining technique or process. For example, inner band cooling passage(s) 126 and/or outer band cooling passage(s) 128 may be EDM drilled in one or more filler packs 154 and/or in airfoil plies 150.

In still other embodiments, at least a portion of cooling passages 126, 128 may be formed using one or more fugitive material inserts. As an example, an insert made from a fugitive material may be in a desired form (e.g., shape, size, etc.) to define an inner band cooling passage 126 or an outer band cooling passage 128. The fugitive material insert is positioned within the layup as airfoil plies 150, cavity plies 152, and/or filler pack(s) 154 are laid up to form airfoil 108. In some embodiments, the insert may be formed of SiC fibers in a silica carbide matrix. The insert may be one of various forms, such as a tape cast, a preformed silicon dioxide tube, or a rapid prototype polymer coating with boron nitride, and the insert may be formed in various manners, e.g., sprayed, screen printed, or injection molded. It may be desirable that the fugitive material insert be a low melting metal or alloy that may melt during a burnout pyrolysis operation or melt infiltration of a CMC layup preform, to thereby leave a void in the preform. In alternative embodiments, the fugitive material insert may be formed of a high temperature material that will not melt during the burnout pyrolysis operation. Such high temperature material inserts may be placed into the CMC during layup as a flexible tape filled with powders of the high temperature materials. Alternately, all of the high temperature material inserts may be placed into the CMC during layup as a dense, flexible wire or an inflexible rod or tube. Such high temperature materials, after the CMC component is melt infiltrated, may require a subsequent air heat treatment to oxidize the high temperature material, a vacuum heat treatment, an inert gas heat treatment, an acid treatment, a base treatment, combinations thereof, or alternating combinations thereof, to remove the fugitive material. Thus, the fugitive material may be removed by melting, dissolution, sublimation, evaporation, or the like, and various materials are suitable for use as the insert, such as materials that exhibit non-wetting of the CMC preform, low or no reactivity with the constituents of the CMC preform, and/or are completely fusible and drainable at a temperature of a thermal treatment performed on the CMC preform. In one example embodiment, fugitive material inserts for defining cooling passages 126, 128 are formed of fused silicon dioxide ($SiO_2$) in a tubular shape, i.e., as quartz tubes, which may be positioned in an array within trailing edge portion 120 of a layup of plies 150, 152, and/or filler pack(s) 154 for forming airfoil 108. Following a melt infiltration process, the fused silicon dioxide is reduced to SiO and leaves the CMC component with voids forming cooling passages 126, 128.

As shown in FIGS. 6A through 6E, using any suitable method for forming cooling passages 126, 128, the cooling passages may be formed in a variety of locations within trailing edge portion 120 of airfoil 108. For example, in one embodiment shown in FIG. 6A, outer band cooling passages 128 are defined adjacent suction side 112 of airfoil 108. In the exemplary embodiment depicted in FIG. 6B, outer band cooling passages 128 are defined adjacent pressure side 110 of airfoil 108. As another example, as shown in FIG. 6C, outer band cooling passages 128 may be defined generally midway between pressure and suction sides 110, 112. In still other embodiments, such as the embodiment illustrated in FIG. 6D, outer band cooling passages 128 may be defined adjacent both pressure side 110 and suction side 112. In yet other embodiment, as depicted in FIG. 6E, outer band cooling passages 128 may be defined at various locations in trailing edge portion 120, e.g., adjacent both pressure and suction sides 110, 112, as well as between pressure and suction sides 110, 112. It will be appreciated that, although FIGS. 6A through 6E illustrate various embodiments with respect to outer band cooling passages 128, inner band cooling passages 126 similarly may be defined in a variety of locations throughout airfoil 108. Further, it should be understood that FIGS. 6A through 6E are illustrative only; inner and outer cooling passages 126, 128 may be defined at any appropriate location or locations and are not limited to the positions illustrated in the figures.

FIG. 7 provides a chart illustrating an exemplary method 700 for fabricating airfoil 108. As represented at 702 in FIG. 7, plies 150, 152 and filler pack(s) 154 are laid up in the form of airfoil 108, i.e., laid up in a desired shape to produce an airfoil preform assembly. The layup step or portion of the process thus may be referred to as the layup preforming step. The layup preforming step may comprise layering multiple plies or structures, such as plies pre-impregnated with matrix material (prepreg plies), prepreg tapes, or the like, to form a desired shape of the resultant CMC component, e.g., airfoil 108. The layers are stacked to form a layup or preform, which is a precursor to the CMC component.

In some embodiments, multiple layups or preforms may be laid up together to form a preform assembly. More particularly, as shown in greater detail in FIG. 8, the layup portion of method 700 depicted at 702 may include laying up multiple preforms, filler packs, and/or plies to form an airfoil preform assembly 108P. An exemplary airfoil preform assembly is illustrated in FIG. 10. In an exemplary embodiment, the layup preforming step 702 may include forming a cavity preform 152P and one or more filler pack preforms 154P, which are laid up with airfoil plies 150 to produce airfoil preform assembly 108P. More specifically, as shown at 802 in FIG. 8, cavity plies 152 are laid up, e.g., in or on a layup tool, mandrel, or mold, to define a cavity preform 152P, which generally defines the shape of cavity 115 of airfoil 108. The cavity preform 152P may be compacted as illustrated at 804, and then processed in an autoclave as shown at 806. The compaction may be performed at atmosphere, i.e., at room temperature. The autoclave processing may be performed at a reduced temperature compared to a standard autoclave cycle such that cavity preform 152P retains some flexibility and malleability after autoclaving. Such flexibility and malleability may help in laying up cavity preform 152P with other preforms and plies to produce preform assembly 108P. In some embodiments, the compaction and/or autoclaving steps 804, 806 may be omitted, i.e., the compaction and autoclaving indicated at 804 and 806 are optional, such that defining the cavity preform 152P comprises laying up cavity plies 152 without additional processing.

The layup preforming shown at 702 in FIG. 7 further may include forming one or more filler pack preforms 154P. As indicated at 808 in FIG. 8, filler pack material 154 is laid up, e.g., in or on a layup tool, mandrel, or mold, to define one or more filler pack preforms 154P. Next, at 810, each filler pack preform 154P is compacted, e.g., at atmosphere as described above with respect to the cavity preform. Then, as shown at 812, filler pack preform(s) 154P are processed in an autoclave, e.g., at a reduced temperature relative to a standard autoclave cycle such that filler pack preform(s) 154P retain some flexibility and malleability after autoclaving. The flexibility and malleability may help in defining voids in the filler pack preform(s) as illustrated at 814 in FIG. 8. More particularly, after autoclaving, filler pack preform(s) 154P are in a green state, and after autoclaving at a reduced temperature, the green state filler pack preforms 154P retain some flexibility and malleability that can assist in further manipulation of the preform. For example, the voids forming inner band cooling passages 126 and/or outer band cooling passages 128 through trailing edge portion 120 of the resultant airfoil 108 may be machined in the green state filler pack preform(s) 154P, and the malleability of green state preform 154P may help in machining cooling passages 126, 128. In some embodiments, such as the embodiment shown in FIG. 9, cooling passage(s) 126, 128 may be formed by machining two green state filler pack preforms 154P, such that one preform 154P defines a first half of passage(s) 126, 128 and the second preform 154P defines the second half of passage(s) 126, 128. That is, each passage 126, 128 may be formed from a first lengthwise half formed in a first preform 154P and a second lengthwise half formed in a second preform 154P. Further, the cooling passages 126, 128 may be formed in filler pack preform(s) 154P using one or more of laser drilling, EDM, cutting, precision machining, or other machining methods. In other embodiments, one or more of cooling passages 126, 128 may be formed using fugitive material inserts that are laid up with filler pack preform 154P to define cooling passages 126, 128 as previously described.

Referring still to FIG. 8, as shown at 816, laying up the CMC material to produce airfoil preform assembly 108P also may include preparing airfoil plies 150 for laying up with cavity preform 152P, filler pack preform(s) 154P, and/or filler pack(s) 154. In some embodiments, preparing the airfoil plies 150 may include cutting plies 150 to define at least a portion of cooling passage(s) 126, 128, e.g., the portion of cooling passage(s) 126, 128 immediately adjacent outlets 132, 136. In other embodiments, cooling passage(s) 126, 128 may be defined in the airfoil preform assembly 108P after the various portions are laid up as shown at 702 in FIG. 7 or after processing the airfoil preform assembly as further described below. It will be appreciated that, when laid up with filler pack preform 154P and cavity preform 152P, airfoil plies 150 generally define the shape of pressure and suction sides 110, 112 of the resultant airfoil 108.

Accordingly, at layup preforming step 702 of exemplary method 700, the cavity preform 152P, filler pack preform(s) 154P, filler pack(s) 154, and/or airfoil plies 150 may be laid up together to form airfoil preform assembly 108P. In some embodiments, the layup preforming step 702 also may comprise positioning one or more fugitive material inserts within the layers to form one or more of cooling passages 126, 128 within airfoil 108 as described above.

Next, airfoil preform assembly 108P is processed as shown at 704 in FIG. 7. For example, airfoil preform assembly 108P may be processed in an autoclave using a standard autoclave process. As such, airfoil preform assembly 108P may be autoclaved at a higher temperature than filler pack preform 154P and cavity preform 152P as described above. After processing, if cooling passage(s) 126, 128, or a portion of cooling passage(s) 126, 128, have not been formed in filler pack preform(s) 154P and/or airfoil plies 150 as described above, these apertures may be defined in the green state airfoil preform assembly 108P. For example, cooling passages 126, 128 may be defined in one or more filler pack preforms 154P, which are covered with airfoil plies 150 to form airfoil preform assembly 108P. Thus, after processing airfoil preform assembly 108P, an outlet portion of each passage 126, 128 may be machined from outer surface 118 through airfoil plies 150 to the corresponding portion of the passage 126, 128 that was formed in filler pack preform(s) 154P. In various embodiments, machining cooling passages 126, 128 in airfoil preform assembly 108P may include one or more of laser drilling, EDM drilling, cutting, or other machining methods.

Then, as shown at 706 in FIG. 7, the airfoil preform assembly 108P may undergo a burn-out cycle, i.e., a burn-out cycle may be performed. In an example burn-out cycle, any mandrel-forming materials, as well as certain fugitive materials or other meltable materials such as additional binders in the CMC plies, are melted to remove such materials. During burn-out, the CMC airfoil preform assembly 108P may be positioned to allow the melted materials to run out of the preform and thus remove the materials from the preform.

Next, as illustrated at 708, the CMC airfoil preform assembly 108P may be subjected to one or more post-processing cycles for densification of the preform assembly. Densification may be performed using any known densification technique including, but not limited to, Silcomp, melt infiltration (MI), chemical vapor infiltration (CVI), polymer infiltration and pyrolysis (PIP), and oxide/oxide processes. Densification can be conducted in a vacuum furnace having an established atmosphere at temperatures above 1200° C. to allow silicon or other materials to melt-infiltrate into the preform component.

Additionally or alternatively, after burn-out and densifying steps 706, 708, airfoil 80 may be manipulated mechanically or chemically as shown at 710 in FIG. 7 to remove any remaining fugitive material inserted into the preformed shape during layup preforming step 702. In some cases, the heat treatment may be used to oxidize the insert to an oxide that may be melted or dissolved in an acid or base. In other embodiments, the insert may be directly dissolved in acid or base, or otherwise chemically dissolved. In further embodiments, the insert may be sublimed or evaporated in a vacuum heat treatment. In still other embodiments, the insert may be oxidized and subsequently sublimed or evaporated in a vacuum heat treatment. Mechanical methods may be used to mechanically remove the insert, and such mechanical methods may or may not be used with any of the previously described methods. Various chemical methods may be utilized as well.

After any remaining fugitive material is removed at step 710, airfoil 108 may be finish machined as shown at 712. Finish machining may include clearing the cooling passage(s) 126, 128 with wire to, e.g., ensure proper flow through the voids. Subsequently, an environmental barrier coating (EBC) may be applied to the airfoil 108, as shown at step 714. A stop-off comb may be inserted into inlet(s) 130, 134 and outlet(s) 132, 136 of cooling passage(s) 126, 128 before the coating is applied to prevent the coating from blocking the cooling passages. In other embodiments, the portion of cooling passage(s) 126, 128 forming inlet(s) 130, 134 and outlet(s) 132, 136 may be defined after the coating is applied, e.g., by machining or another appropriate technique or process, such that no stop-off comb is required during EBC application.

Method 700 is provided by way of example only; it will be appreciated that some steps or portions of method 700 may be performed in another order or may be omitted or repeated as needed. Additionally, other methods of fabricating or forming airfoil 108 may be used as well. In particular, other processing cycles, e.g., utilizing other known methods or techniques for compacting CMC plies, may be used. Further, airfoil 108 may be post-processed using a melt infiltration process, a chemical vapor infiltration process, a matrix of pre-ceramic polymer fired to obtain a ceramic matrix, or any combinations of these or other known processes.

Further, when inner and outer bands 102, 104 are formed from CMC materials, similar methods as described above with respect to method 700 may be used to form the inner band 102, which defines inner band cavity 122 and inner band aperture(s) 129, and/or the outer band 104, which defines outer band cavity 124 and outer band aperture(s) 133. Moreover, after inner band 102, outer band 104, and airfoil 108 are fabricated from a suitable material, the turbine nozzle segment 100 is assembled such that airfoil 108 extends from inner band 102 to outer band 104 and inner band aperture(s) 129 are aligned with inner band inlet(s) 130 and outer band aperture(s) 133 are aligned with outer band inlet(s) 134. In appropriate embodiments, turbine nozzle segment 100 may be formed from a CMC material such that the inner band 102, outer band 104, and airfoil 108 are a single, unitary component.

This written description uses examples to disclose the invention, including the best mode, and also to enable any person skilled in the art to practice the invention, including making and using any devices or systems and performing any incorporated methods. The patentable scope of the invention is defined by the claims and may include other examples that occur to those skilled in the art. Such other examples are intended to be within the scope of the claims if they include structural elements that do not differ from the literal language of the claims or if they include equivalent structural elements with insubstantial differences from the literal language of the claims.

What is claimed is:

1. A method of cooling an airfoil of a turbine nozzle segment, the airfoil extending from an inner band to an outer band, the airfoil including a trailing edge portion, the trailing edge portion defining a plurality of internal inner band cooling passages for conveying a cooling fluid and a plurality of internal outer band cooling passages for conveying the cooling fluid, the method comprising:

supplying the cooling fluid from an inner band cavity defined by the inner band through each inner band aperture of a plurality of inner band apertures defined in the inner band directly to an inlet of a respective one of the inner band cooling passages of the plurality of inner band cooling passages; and supplying the cooling fluid from an outer band cavity defined by the outer band through each outer band aperture of a plurality of outer band apertures defined in the outer band directly to an inlet of a respective one of the outer band cooling passages of the plurality of outer band cooling passages, wherein the inlet of each inner band cooling passage is defined adjacent an inner band aperture to provide fluid communication directly from only the inner band cavity to the inner band cooling passages via the inner band apertures, and wherein the inlet of each outer band cooling passage is defined adjacent an outer band aperture to provide fluid communication directly from only the outer band cavity to the outer band cooling passages via the outer band apertures.

2. The method of claim 1, wherein each inner band cooling passage and each outer band cooling passage includes an outlet defined in an outer surface of the airfoil, wherein each inner band cooling passage directs the cooling fluid from the inner band cavity to the outer surface of the airfoil, and wherein each outer band cooling passage directs the cooling fluid from the outer band cavity to the outer surface of the airfoil.

3. The method of claim 1, wherein the inlets of the plurality of inner band cooling passages are axially spaced apart from one another along the trailing edge portion of the airfoil, and wherein the inlets of the plurality of outer band cooling passages are axially spaced apart from one another along the trailing edge portion of the airfoil.

4. The method of claim 1, wherein the airfoil is formed from a ceramic matrix composite (CMC) material, and wherein the plurality of inner band cooling passages and the plurality of outer band cooling passages are defined in the trailing edge portion when the CMC material forming the trailing edge portion is in a green state.

5. The method of claim 1, wherein the airfoil includes opposite pressure and suction sides extending radially along a span, and wherein the plurality of inner band cooling passages are defined adjacent the suction side.

6. The method of claim 1, wherein the airfoil includes opposite pressure and suction sides extending radially along a span, and wherein the plurality of outer band cooling passages are defined adjacent the pressure side.

7. The method of claim 1, wherein the airfoil includes opposite pressure and suction sides extending radially along a span, and wherein the plurality of inner band cooling passages and the plurality of outer band cooling passages are defined midway between the pressure and suction sides.

* * * * *